US010885703B2

(12) United States Patent
Kerckaert et al.

(10) Patent No.: US 10,885,703 B2
(45) Date of Patent: Jan. 5, 2021

(54) POINT CLOUD PREPROCESSING AND RENDERING

(71) Applicant: Bricsys NV, Ghent (BE)

(72) Inventors: Johan Kerckaert, Halen (BE); Filip Rooms, Ghent (BE); Luc De Batselier, Drongen (BE); Erik De Keyser, Lochristi (BE)

(73) Assignee: BRICSYS NV, Ghent (BE)

( * ) Notice: Subject to any disclaimer, the term of this patent is extended or adjusted under 35 U.S.C. 154(b) by 41 days.

(21) Appl. No.: 16/334,832

(22) PCT Filed: Jan. 5, 2018

(86) PCT No.: PCT/EP2018/050231
§ 371 (c)(1),
(2) Date: Mar. 20, 2019

(87) PCT Pub. No.: WO2018/127547
PCT Pub. Date: Jul. 12, 2018

(65) Prior Publication Data
US 2020/0020154 A1    Jan. 16, 2020

(30) Foreign Application Priority Data
Jan. 5, 2017   (EP) ..................... 17150456

(51) Int. Cl.
*G06T 17/00*    (2006.01)
*G06T 15/04*    (2011.01)
(Continued)

(52) U.S. Cl.
CPC ............ *G06T 17/005* (2013.01); *G06T 15/04* (2013.01); *G06T 15/06* (2013.01); *G06T 17/05* (2013.01);
(Continued)

(58) Field of Classification Search
CPC ....... G06T 17/005; G06T 15/04; G06T 15/06; G06T 17/05; G06T 17/20; G06T 2210/12; G06T 2210/36; G06T 2210/56
See application file for complete search history.

(56) References Cited

U.S. PATENT DOCUMENTS

| 7,940,279 | B2 | 5/2011 | Pack | |
| 2011/0087662 | A1* | 4/2011 | Darby, Jr. | ............. G06Q 50/08 707/736 |

(Continued)

OTHER PUBLICATIONS

Markus Schuetz et al.; "Potree: Rendering Large Point Clouds in Web Browsers"; Sep. 19, 2016; Retrieved from the Internet: URL: https://publik.tuwien.ac.at/files/publ. Abstract, Section 3 and subsections, in particular 3.3.1, 3.3.2 and 3.4.

(Continued)

*Primary Examiner* — William A Beutel
(74) *Attorney, Agent, or Firm* — Maschoff Brennan

(57) ABSTRACT

The invention concerns a computer-implemented preprocessing method for dividing a point cloud in cells, whereby for each cell a set of levels of detail is created, each level of detail comprising a set of points and a minimal distance; a data structure for storing a preprocessed point cloud; a computer-implemented rendering method for creating a pixelated image based on a stored preprocessed point cloud and a view frustum; and a viewing method involving a computing system to select a view frustum with a user interface and to present a pixelated image of a point cloud on a screen.

16 Claims, 6 Drawing Sheets

(51) Int. Cl.
*G06T 15/06* (2011.01)
*G06T 17/05* (2011.01)
*G06T 17/20* (2006.01)

(52) U.S. Cl.
CPC .......... *G06T 17/20* (2013.01); *G06T 2210/12* (2013.01); *G06T 2210/36* (2013.01); *G06T 2210/56* (2013.01)

(56) References Cited

U.S. PATENT DOCUMENTS

| | | | |
|---|---|---|---|
| 2012/0290542 A1* | 11/2012 | Trotta | G06F 16/2365 707/687 |
| 2013/0249899 A1 | 9/2013 | Meeussen | |

OTHER PUBLICATIONS

Rico Richter et al.; "Out-of-Core GPU-based Change Detection in Massive 3D Point Clouds"; Transactions in GID, Dec. 5, 2012, pp. n/a-n/a.

\* cited by examiner

POINT CLOUD PREPROCESSING AND RENDERING

This application claims the benefit of European Application No. 17150456.6 filed Jan. 5, 2017 and PCT/EP2018/050231 filed Jan. 5, 2018, International Publication No. WO 2018/127547 A1, which are hereby incorporated by reference in their entirety as if fully set forth herein.

TECHNICAL FIELD

The invention pertains to the technical field of point clouds in computer assisted design. In a first aspect, the invention pertains to a computer-implemented preprocessing method for dividing a point cloud in cells, and whereby for each cell a set of levels of detail is created, each level of detail comprising a point set and a minimal distance. In a second aspect, the invention pertains to a data structure for storing a preprocessed point cloud. In a third aspect, the invention pertains to a computer-implemented rendering method for creating a pixelated image based on a stored preprocessed point cloud and a view frustum. In a fourth aspect, the invention pertains to a viewing method involving a computing system, whereby a user selects a view frustum with a user interface, and whereby a pixelated image of at least a part of a point cloud is presented on a screen of the computing system.

BACKGROUND

U.S. Pat. No. 7,940,279 describes a system and a method for rendering of texel imagery. A point cloud data set may be pre-processed for fast and efficient rendering. The pre-processing may comprise creating an octree hierarchy from the data, generating a level of detail (LOD) representation for each octree node, simplifying the points in each node according to a simplification tolerance, and storing the data structure in a file. Textures associated with each node may be stored in a separate, compressed file, such as a texture atlas. At render time, the octree and LOD hierarchy may be traversed until a suitable LOD node is found. The associated texture data may be accessed, and the node may be rendered as a textured quadrilateral and/or a splat point primitive. In an alternative approach, multiple point cloud datasets may be merged using a global transform function. The merged dataset may be simplified using a hierarchical LOD tree. Textures may be ascribed to each LOD node. The resulting structure may be rendered using splat and billboard point primitives. The model may be streamed over a network to a client where the rendering may take place.

The abovementioned method for point cloud preprocessing comprises the steps of creating an octree hierarchy in the point cloud. The octree hierarchy thereby comprises a hierarchy of nodes, whereby a volume may be recursively split as many times as necessary to obtain a desired level of granularity or a leaf node is reached, and in which a leaf node may be created when only a small number of points are left in the node. A single LOD representation is associated with each octree node or leaf.

US 2013/0,249,899 describes a point cloud data hierarchy and a method for presenting views of a very large point data set, the method comprising: storing data on a storage system that is representative of a point cloud comprising a very large number of associated points; automatically and deterministically organizing the data into an octree hierarchy of data sectors, each of which is representative of one or more of the points at a given octree mesh resolution; receiving a command from a user of a user interface to present an image based at least in part upon a selected viewing perspective origin and vector; and assembling the image based at least in part upon the selected origin and vector, the image comprising a plurality of data sectors pulled from the octree hierarchy.

In the abovementioned documents, the entire point cloud is treated as one object which can be rendered at several LOD. With each octree node, a single LOD is associated. The points in an octree node are collapsed to form a new point for a coarser LOD in a larger node higher up in the octree hierarchy. For point clouds representing multiple objects, it might therefore not be possible to present the objects at certain desired distinct levels of detail. Furthermore, the LOD creation for the point cloud is limited to octree subdivision of space. This might not be optimal, for example for elongated objects such as a tube, where initial parallel slicing of the elongated object would be more suitable. In addition, for rendering the point cloud at least partially, the level of detail is tangled with the octree node choice. Upon selection of a coarser level of detail, a larger node is automatically selected.

The present invention aims to resolve at least some of the problems mentioned above.

SUMMARY OF THE INVENTION

In a first aspect, the present invention provides a computer-implemented preprocessing method to preprocess a large point cloud. The large point cloud comprises points. Each of the points comprises at least coordinates which define a location in space. The point cloud is recursively subdivided in cells with slice planes. Subdivision of a given cell is stopped once the cell contains at most a predetermined amount of points. Preferably, the slice planes are chosen to split the number of points in a cell approximately in half, while in addition preserving locality. For a cell containing the predetermined amount of points or less, a set of discrete levels of detail is created. A new coarser level of detail (LOD) is constructed from a former finer LOD, thereby recursively creating the set of LODs. The points at the finer LOD are thereto subdivided into one or more groups. The points within a group are collapsed to a collapsed point. This collapsed point is part of the new coarser LOD. The preprocessed point cloud is stored in one or multiple files on a non-transitory storage system. The preprocessed point cloud comprises geometrical information on the cell subdivision of the point cloud. The geometrical information is thereby sufficient to determine a bounding box for each cell. For each cell, the preprocessed point cloud further comprises the number of LODs, the points of each LOD, and the minimal distance between the points at each LOD.

In a second aspect, the present invention provides a data structure suitable for storing a preprocessed point cloud according to the first aspect of the present invention.

In a third aspect, the present invention provides a computer-implemented rendering method for creating a pixelated image based at least in part on a preprocessed point cloud according to the first aspect of the present invention and a view frustum. The preprocessed point cloud is stored on a non-transitory storage system. The pixelated image comprises an image plane and pixels. The rendering method comprises several steps. The geometrical information sufficient to determine the bounding box of each cell is loaded from the non-transitory storage system. Based at least in part on the view frustum, the cells which contribute to the pixelated image are determined. For each of the contributing cells, one of its minimal distances is chosen based at least in part on the bounding box, the view frustum, and the size of the pixels. The sets of points of the contributing cells corresponding to the chosen minimal distances are loaded from the non-transitory storage system, and a pixelated image is created based at least in part on the loaded sets of points.

In a fourth aspect, the present invention provides a viewing method for at least partially presenting a point cloud on a screen of a computing system. The computing system comprises a screen, a user interface, a processor, and a non-transitory storage system. The non-transitory storage system comprises the point cloud, and optionally a preprocessed point cloud according to the first aspect of the present invention. The viewing method comprises several steps. If the non-transitory storage system does not comprise a preprocessed point cloud based at least in part on the point cloud to be presented on the screen, the computer-implemented preprocessing method according to the first aspect of the present invention is executed in order to store a suitable preprocessed point cloud on the non-transitory storage system. The screen resolution is determined for specifying some of the characteristics of the pixelated image. A view frustum is provided by means of the user interface. The computer-implemented rendering method according to the third aspect of the present invention is executed on the computing system. The pixelated image is presented on the screen.

These aspects are advantageous for several reasons. The slice plane subdivision serves to subdivide the entire point cloud into cells or objects. For each of the cells or objects an independent set of levels of detail is subsequently constructed. Depending on the view frustum for creating a pixelated image, the contributing cells can be quickly determined and a relevant level of detail for each contributing cell chosen. The point set of a relevant level of detail for each of the contributing cells can then be loaded from the non-transitory storage medium, and an image can be rendered from the loaded point sets. When using, for example, a single hierarchy for subdividing the point cloud in nodes and creating one level of detail per node, the choice of which nodes are visible is tangled with the choice of the optimal level of detail. The choice of a coarser level of detail, for example, necessarily implies choosing a larger node. With the present invention, the determination of which cells are visible is separate from, and is performed before, choosing a level of detail for the visible cells.

In addition, the preprocessing method needs to be performed only once and only the relevant parts of the stored preprocessed point cloud can be loaded for rendering different pixelated images of the point cloud at different points in time.

The preprocessing method according to the first aspect of the present invention also allows for speed-up on computing systems comprising multiple processor cores. The hierarchical subdivision of two or more disjoint cells by means of slice planes can be performed in parallel. In addition, the creation of a set of levels of detail for a cell with at most the predetermined amount of points can be performed while further subdividing other cells. The creation of sets of levels of detail for two or more different cells can also be performed in parallel. In the detailed description, a speed-up strategy for generating a set of levels of detail for one cell is discussed as well.

The slice plane subdivision also allows for versatility. For elongated point clouds, for example representing an elongated tube, a median cut algorithm may be used for cell subdivision along the largest dimension, thereby first slicing the elongated point cloud in smaller disks along the elongated direction, and only subsequently dividing the small disks in the angular and radial directions of the elongated tube. In addition, different subdivision algorithms comprising slice planes can be used for different subdivisions within a single execution of the preprocessing method. The method to form groups of points for the creation of levels of detail within a cell may also be different from the cell subdivision method. This versatility allows for optimal tailoring of the method for the subdivision or grouping step under consideration.

DETAILED DESCRIPTION OF THE INVENTION

Figure 1:
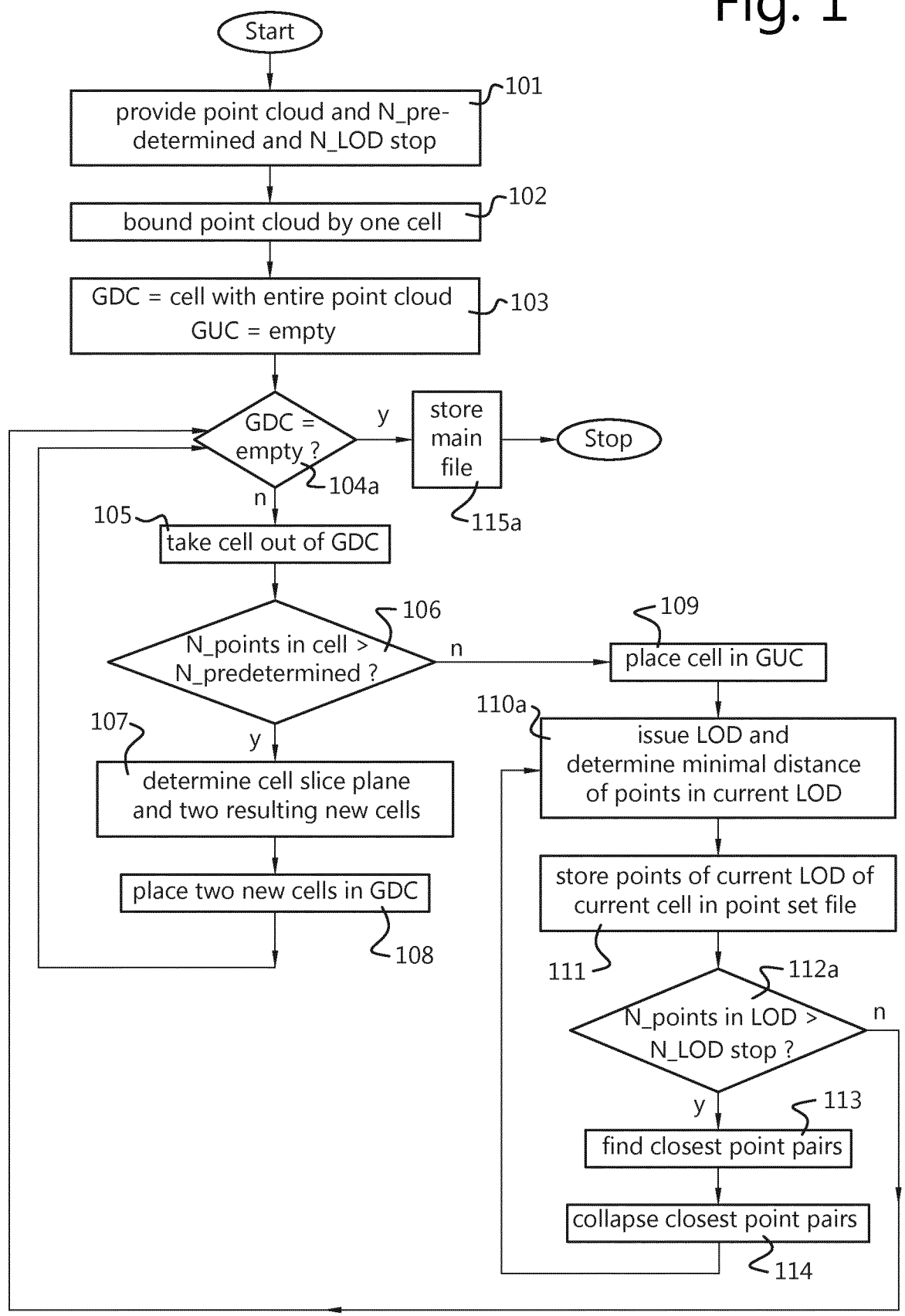
FIGS. 1 and 2 show flow charts of preferred embodiments of the preprocessing method according to the present invention.

In a first aspect, the present invention concerns a computer-implemented preprocessing method for subdividing a large point cloud in cells and for creating a set of levels of detail for each cell. In a second aspect, the present invention provides a data structure suitable for storing a preprocessed point cloud. In a third aspect, the present invention provides a computer-implemented rendering method for creating a pixelated image based at least in part on a preprocessed point cloud and a view frustum. In a fourth aspect, the present invention provides a viewing method for at least partially presenting a point cloud on a screen of a computing system. The summary of these four aspects is given in the corresponding section. In this section, preferred embodiments, enabling details, and examples will be discussed in order to further elucidate the present invention.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" or "approximately" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" or "approximately" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

A "view frustum" is a region of space that may appear on a screen or image. It is the field of view of a notional camera. The view frustum is typically obtained by taking a truncation or frustum from the pyramid of vision, which is the rectangular adaptation of an idealized cone of vision for a camera with a rectangular viewport. The planes which truncate the pyramid are called the near plane or front view plane and the far plane or rear view plane. Objects closer to the camera than the near plane or beyond the far plane are not drawn. The far plane can be placed infinitely far away from the camera so all objects within the frustum are drawn regardless of their distance to the camera. Choosing a view frustum at least comprises choosing a point of view and a direction of view. It may also comprise choosing one or more of the following: angles of view which determine the shape of the pyramid, the relative position of the near plane, and the relative position of the far plane.

The computer-implemented preprocessing method according to the first aspect of the present invention comprises the recursive subdivision of the point cloud under consideration into cells. The subdivision is performed by means of slice planes. Recursive subdivision of a cell is stopped when the cell contains at most the predetermined amount of points. Preferably, a slice plane splits the number of points in a cell approximately in half, while preserving locality of the points in the two thereby created cells.

In an embodiment of the preprocessing method, the point cloud is initially surrounded by a first finite bounding cell, which is then subsequently recursively split into smaller cells according to the preprocessing method. If, for example, the coordinates of the points are Cartesian coordinates, a surrounding rectangular cell can be based on the smallest and the largest x-, y-, and z-coordinates of all points. In another embodiment of the preprocessing method, cells can be infinite, partially infinite, or finite. For example, the first slice plane of a preprocessing method according to the latter embodiment then creates two semi-infinite cells from an initial unbounded infinite cell. In this document, the term bounding box of a cell should therefore be interpreted as an infinite, partially infinite, or finite box sufficient to distinguish the region occupied by the cell from regions occupied by other cells.

Possible methods for recursive subdivision of the point cloud into cells by means of slice planes can be based on an octree, a k-d tree, a median cut algorithm, and/or a symmetry quality metric. Possible methods for recursive subdivision of the point cloud into cells may also be based on other methods, techniques, and/or algorithms such as, for example, an R-tree, a bounding volume hierarchy, or binary space partitioning.

In an octree subdivision, each subdivision step comprises the introduction of three mutually orthogonal slice planes to divide a cell in eight octants. Preferably, each of the three mutually orthogonal slice planes is thereby positioned to split the number of points in the cell approximately in half. The three mutually orthogonal slice planes then divide the point group in eight parts comprising approximately the same number of points. In a k-d tree subdivision, cells are recursively subdivided into two parts by means of slice planes. The subsequent slice planes of a k-d tree are cyclically chosen orthogonal to a set of perpendicular axes, for example the x-, y-, and z-axes in three-dimensional Euclidian space. Preferably, the slice planes in a k-d tree are chosen to subdivide the number of points in a cell approximately in half. In a median cut subdivision, three-dimensional space is recursively subdivided into two parts by means of slice planes. The subsequent slice planes in a median cut subdivision are chosen perpendicular to the longest dimension of the cell. Preferably, the slice planes in a median cut method are chosen to subdivide the number of points in a cell approximately in half. In a subdivision based on a symmetry quality metric, three-dimensional space is recursively subdivided into two parts by means of slice planes. Each of the slice planes in a subdivision based on a symmetry quality metric is not only chosen to approximately subdivide the number of points in a cell approximately in half, but also to optimize one or more symmetry quality measures based at least in part on the position of at least some of the points with respect to each other as well as with respect to the slice plane. The slice plane thereby aims to slice the point set in a cell into two substantially mirroring point sets on either side of the slice plane.

In a preferred embodiment of the preprocessing method, the recursive subdivision is based at least in part on one of the following: an octree, a k-d tree, and a median cut algorithm. This is advantageous as the corresponding subdivision of a cell requires only a single loop over the coordinates of the points in the cell and is computationally cheap.

In a preferred embodiment of the preprocessing method, the predetermined amount of points is at least 1000 and at most 64000, preferably at least 2000 and at most 32000, more preferably at last 4000 and at most 16000, most preferably at least 6000 and at most 12000, such as 6000, 7000, 8000, 9000, 10000, 11000, 12000, or any value in between. This is advantageous as these predetermined amounts still allow for keeping all coordinates of a point set of a cell simultaneously in the transitory memory of a computing system, e.g. the random access memory. They further allow for quick scanning through the point set for the formation of one or more groups for level of detail creation in the cell.

The computer-implemented preprocessing method also comprises for each cell containing at most the predetermined amount of points, the creation of a set of discrete levels of detail for the cell. The set of levels of detail is created by recursively constructing a new coarser level of detail from a former finer level detail. Each level of detail comprises a point set. The points of a former finer level of detail are subdivided into one or more groups. For each group, the points it contains are collapsed into a collapsed point. This collapsed point is part of the point set of the new coarser level of detail. The original point set in the cell is the finest level of detail, and one or more levels of detail are recursively created in this way, forming the set of levels of detail.

In a preferred embodiment of the preprocessing method, a group of points to be collapsed in a cell comprises a closest point pair within the cell. In an even more preferred embodiment of the preprocessing method, each group of points to be collapsed consists either of a closest point pair or a single point. In the most preferred embodiment of the preprocessing method, there is at most one group containing exactly one point.

This is advantageous as the collapse of closest point pairs allows for a large number of levels of detail in a set, as only two points are collapsed per group with each additional level of detail creation. This large number of levels of detail allows for a fluid transition between the levels of detail. In addition, closest point pairs preserve locality in the group creation as much as possible. The overhead associated with closest point pair collapse is also limited. An estimate of the overhead factor associated with the storage of the point sets of all levels of detail is $$1+\tfrac{1}{2}+\tfrac{1}{4}+\tfrac{1}{8}+\ldots =2,$$

whereby this factor should be interpreted as follows: the number of points to be stored for all point sets for a given cell is approximately two times the number of points in the point set of the finest level of detail, i.e. the original points in the cell. In the formula above, 1 corresponds to the number of points in the finest level of detail, ½ to the number of points in the second level of detail created from the finest level of detail, ¼ to the number of points in the third level of detail created from the second level of detail, . . . The search for closest point pairs can also be performed efficiently, and can be efficiently parallelized on a computing system with multiple processor cores yielding substantial speed-up.

In a preferred embodiment of the preprocessing method, a dynamic grid is imposed over a cell for the creation of the levels of detail. The dynamic grid can be rectangular and can subdivide the cell in rectangular cuboids. When a closest point to a given point needs to be found, i.e. a closest point pair comprising the given point, only the cuboid containing the given point and the at most 26 adjacent cuboids need to be searched for the closest point, if the dynamic grid is well chosen.

This is advantageous as it speeds up the search for closest point pairs, as only the distance of a limited number of points to the given point needs to be assessed. It is further advantageous as it allows for parallelization of the closest point pair search on a computing system with multiple processor cores, which can yield a further substantial speed-up. Thereto different processes or threads search for closest point pairs in distant cuboids and their neighbors. As long as a cuboid group associated with a certain process or thread, the cuboid group comprising the selected cuboid and its neighbors, does not overlap with any cuboids of cuboid groups of other processes or threads, both the corresponding data access and closest point pair search can be performed independently.

In a preferred embodiment of the preprocessing method, the collapsed point based on a group of points is an equally weighted centroid of the points within the group. For point groups consisting of one closest point pair, the centroid is at the center between the point pair. In another embodiment, the collapsed point based on a group of points may also well be an unequally weighted centroid of the points within the group. For point groups consisting of one closest point pair, the centroid can then lie on or near one of both points, anywhere between the point pair, anywhere on the line connecting the point pair, or the point of the point pair closest to the cell boundary.

The use of equally weighted centroids during point group collapse is advantageous as it is easy to perform, for example by averaging the Cartesian coordinates of the points in a point group. It is further advantageous as it automatically preserves locality in an optimal way. Placing the collapsed point on the point of the group closest to the cell boundary is advantageous as it provides a good representation of the boundary of the point cloud as seen from a position outside of the cell.

The computer-implemented preprocessing method also comprises the storage of the preprocessed point cloud in one or multiple files on a non-transitory storage system. The preprocessed point cloud and a stored data structure according to the second aspect of the present invention thereto comprise geometrical information on the cell subdivision of the point cloud, whereby the geometrical information is sufficient to determine a bounding box for each cell, as well as for each cell the number of levels of detail for the cell, the points in the point set of each level of detail of the cell, and the minimal distance between the points of each level of detail of the cell.

In a preferred embodiment of the preprocessing method, the non-transitory storage system comprises two or more non-transitory storage mediums. The preprocessed point cloud is stored into two or more files, and at least two of the non-transitory storage mediums each comprise at least one of the files.

Examples of non-transitory storage mediums are hard disk drives, solid state drives, tapes, or any other product suitable for the non-transitory or non-volatile storage of computer data, the computer data preferably digital data. An example of a non-transitory storage system is a general purpose file system comprising two or more hard disk drives or solid state drives. Another example of a non-transitory storage system comprises two or more physically remote non-transitory storage mediums, interconnected by a form of data transmission. The non-transitory storage mediums can thereby be located in different rooms or different buildings, for example. The data transmission can thereby comprise an Ethernet or Wi-Fi connection. Another example of a non-transitory storage system comprises the local disks of nodes of a high-performance computer, a disk of a node locally interconnected with a transitory storage medium of the node and the transitory storage mediums of different nodes interconnected with InfiniBand.

This is advantageous for several reasons. During parallel creation of levels of details in different cells by remote processor cores, the point sets of the levels of detail of the different cells can be stored on non-transitory storage mediums close to the processor cores, thereby substantially limiting the overall data transmission time.

In a preferred embodiment of the preprocessed point cloud data structure, the data structure is suitable for storing a preprocessed point cloud in a main file and one or more additional point set files. Hereby, the main file comprises the geometrical information sufficient to determine a bounding box for each cell, the number of levels of detail for each cell, and the minimal distance for each of the levels of detail for each of the cells. Each of the point set files comprises a set of points associated to a level of detail of a cell. Preferably, a point set file contains only point sets of a single cell. More preferably, each point set file contains only a single point set. In addition, the main file can also comprise file pointers to point set files. In an embodiment, the main file can also comprise for each cell a file pointer to a first point set file corresponding to a first level of detail, the first point set file comprising a file pointer to a second point set file corresponding to a second level of detail, . . .

This is advantageous for several reasons. A file manager and/or file system can move and handle smaller files easier. A chunked file structure based on different point sets can thereby form an optimum between grouping relevant data together and file chunking. In addition, different point set files can be stored on different non-transitory storage mediums, e.g. on the local disk of the node on which the levels of detail of a particular cell are created. The file structure is in addition advantageous as it becomes easier to handle the permissions to open, close, read, and write to different files. This is advantageous if distinct processes or threads handle information related to different point sets. This is further advantageous for a single process or thread to speed up writing and/or reading multiple point sets simultaneously, as input and output to a non-transitory storage medium can be the time determining bottleneck.

The computer-implemented rendering method according to the third aspect of the present invention is suitable to render at least a part of a stored preprocessed point cloud in a pixelated image according to a view frustum. The pixelated image thereby comprises an image plane and pixels. Further aspects of the rendering method are summarized in the respective section above.

In a preferred embodiment, the rendering method allows to render the pixelated image in parts. Thereto the image plane is divided in regions. Partial pixelated images are obtained per region. The regions are thereby treated preferably at least partially in sequence. During the formation of a partial pixelated image, only the sets of points corresponding to the minimal distances of the cells contributing to the partial pixelated image are loaded to a transitory storage medium, e.g. the random access memory. This is advantageous for rendering pixelated images of large point clouds, as it allows to keep transitory storage medium usage, e.g. random access memory usage, under control as the transitory storage medium comprises at any given point in time at most only a part of the point sets required to render the full pixelated image. In an even more preferred embodiment, the regions and their sizes are chosen based on the available transitory storage medium.

The viewing method according to the fourth aspect of the present invention is suitable for at least partially presenting a large point cloud on a screen of a computing system. The computing system thereby comprises a screen, a user interface, a processor, and a non-transitory storage system. By means of the user interface a view frustum is provided. The rendering method according to the third aspect of the present invention is executed to render at least a part of the point cloud in a pixelated image based at least in part on the view frustum. The pixelated image is then presented on the screen.

In an embodiment of the viewing method, at least a part of the non-transitory storage system is physically remote from the screen and the user interface. Furthermore at least a part of the preprocessed point cloud is stored on a remote part of the non-transitory storage system. In a first version of this embodiment, the processor is also located nearby the screen and the user interface. Preferably, the preprocessed point cloud is stored in a main file and one or more point set files, as described earlier in this document. Upon selection of the view frustum with the user interface, the cells which contribute to the pixelated image are determined based on information stored in the main file and suitable minimal distances are chosen for each cell. Only the relevant point set files then need to be loaded from the non-transitory storage medium to create the pixelated image on the processor. Even when remote storage, e.g. cloud storage, is used in this first version of the embodiment, only a limited amount of data needs to be loaded from the non-transitory storage medium and transferred to the processor for processing. In a second version of this embodiment, the processor is located near the remote part of the non-transitory storage medium. This has the advantage that the relevant point sets do not need to be transferred over a long distance, they are locally processed by the processor to create the pixelated image. Only the pixelated image then needs to be transferred to the screen. Both versions can entail significant reductions in data communication, while utilizing the advantages of remote storage such as central access by a large group of users and management, servicing, and back-up of the non-transitory storage medium by a third-party service.

The invention is further described by the following non-limiting examples which further illustrate the invention, and are not intended to, nor should they be interpreted to, limit the scope of the invention.

EXAMPLES

Example 1

A First Embodiment of a Serial Preprocessing Method

In the first example, an embodiment of the preprocessing method for serial computer-implemented execution is explained. A flow chart of this embodiment is provided in FIG. 1. A point cloud and two parameters are provided in step 101. The two parameters are the predetermined amount of points for stopping subdivision of a cell N(predetermined), and the number of points in a level of detail for stopping the creation of further coarser levels of detail N(LOD stop). In step 102, the whole point cloud is surrounded by a single first cell. This first cell is initially the only cell in the group of dividable cells (GDC) in step 103. Furthermore, an empty group of undividable cells (GUC) is also provided in step 103. As long as the GDC in not empty (step 104a), a cell is taken out of the GDC (step 105). If the number of points in the cell N(points in cell) is larger than N(predetermined) (step 106), a slice plane based on the median cut algorithm is used to divide the cell into two new cells (step 107). These two new cells are placed in the GDC (step 108), and it is again assessed whether the GDC is empty or not (step 104a). If the number of points in the cell N(points in cell) is not larger than N(predetermined) (step 106), the cell is placed in the GUC (step 109), and a first finest level of detail is generated based on the original points in the cell (step 110a). The minimal distance between the points in the current level of detail is determined as well (step 110a). The set of points of the current level of detail of the current cell is stored in a point set file. If the number of points in the set of points is larger than N(LOD stop) (step 112a), a new level of detail is created by finding closest point pairs (step 113) and collapsing the closest point pairs (step 114). Subsequently, the minimal distance of the new level of detail is determined (step 110a) and the corresponding point set stored (step 111). If the number of points in the set of points is on the other hand not larger than N(LOD stop), it is again assessed whether the GDC is empty (step 104a). If it is empty, the main file comprising the geometric data sufficient to determine a bounding box for each cell, the number of levels of detail of each cell, and the minimal distances for each level of detail of each cell, is created and/or stored (step 115a). In the first example, the levels of detail for a cell are created as soon as the cell becomes part of the GUC. Only subsequently another cell is taken out of the GDC for either subdivision or level of detail creation.

Example 2

A Second Embodiment of a Serial Preprocessing Method

Figure 2:
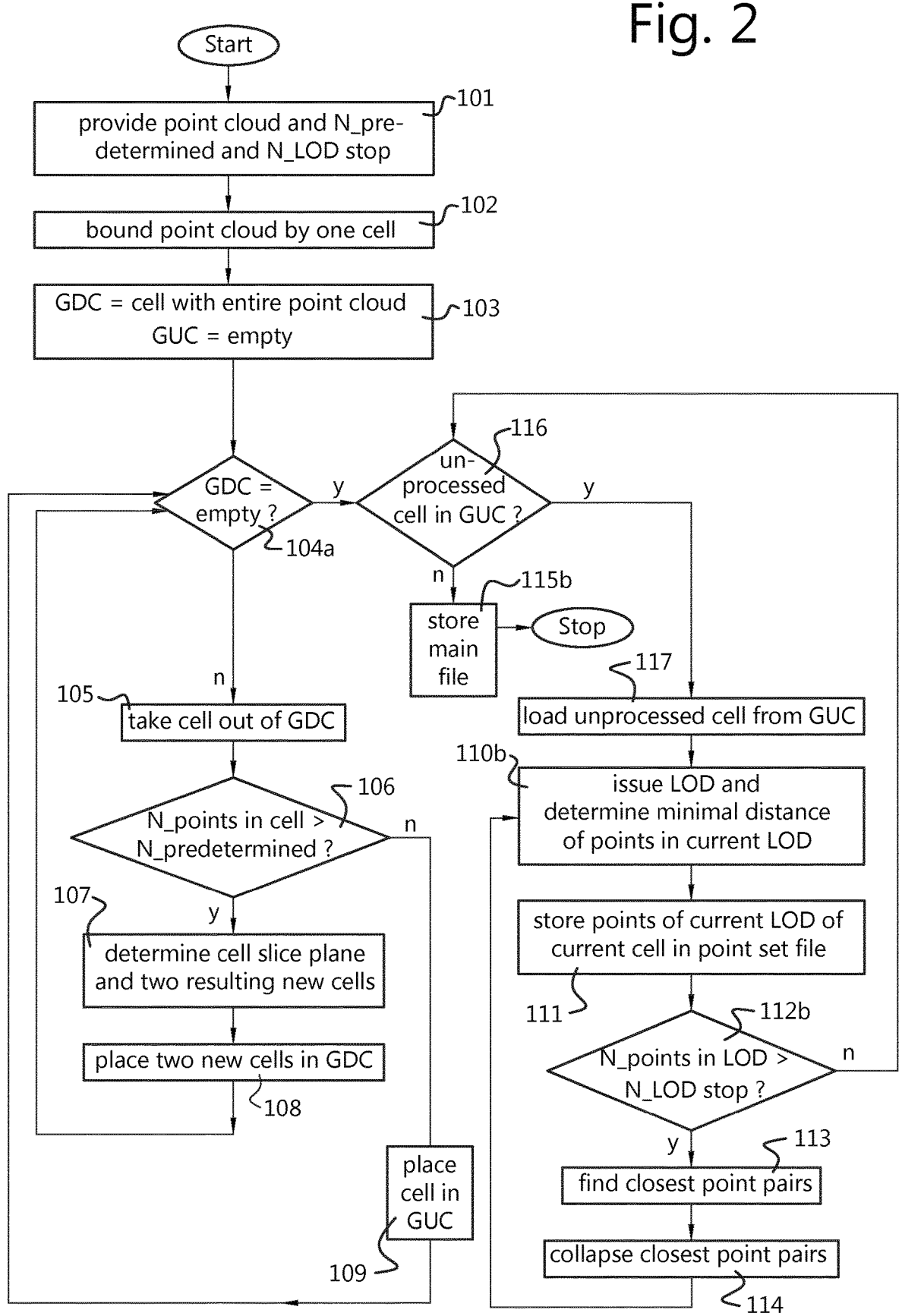

In the second example, another embodiment of the preprocessing method for serial computer-implemented execution is explained. A flow chart of this embodiment is provided in FIG. 2. Many steps in the flow chart are similar to the steps in the first example and are therefore indicated with the same number. Only the most important differences are therefore highlighted in this example. When N(points in cell) is not larger than N(predetermined) (step 106), the cell is placed in the GUC (step 109), but not immediately processed for creating levels of detail. Only when the GDC is empty (step 104b), it is assessed whether an unprocessed cell remains in GUC (step 116). If an unprocessed cell remains in the GUC, it is loaded (step 117) and levels of detail are created in a method similar to the first example (steps 110b, 111, 112b, 113, 114). If no unprocessed cell remains in the GUC, the main file is stored (step 115b). In this second example, levels of detail are only created when all cells are sufficiently subdivided.

Example 3

An Embodiment of a Parallel Preprocessing Method

Based on the first and the second example, a preprocessing method for execution on a computing system comprising multiple processors and/or processor cores can be defined. In this method, processes and/or threads are divided over the remaining workload, i.e. the cells to be subdivided in the GDC and the unprocessed cells in the GUC. Thereby, cells in the GUC can be processed for the creation of levels of detail, while simultaneously other cells from the GDC are subdivided by means of slice planes.

Example 4

Locality in Different Slice Plane Subdivision Methods for Point Clouds

Figure 3A:
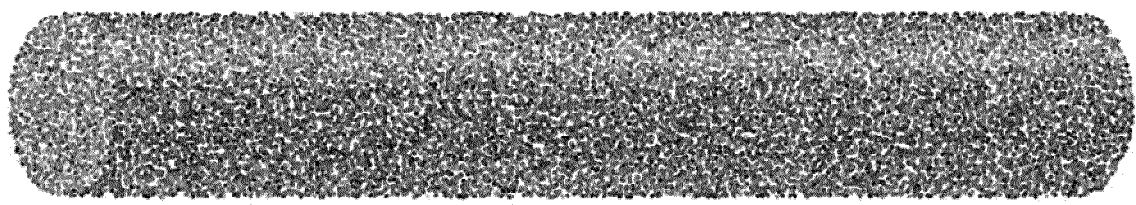
FIGS. 3A, 3B, 3C and 3D show embodiments of subdivisions of an elongated point cloud by slice planes.
Figure 3B:
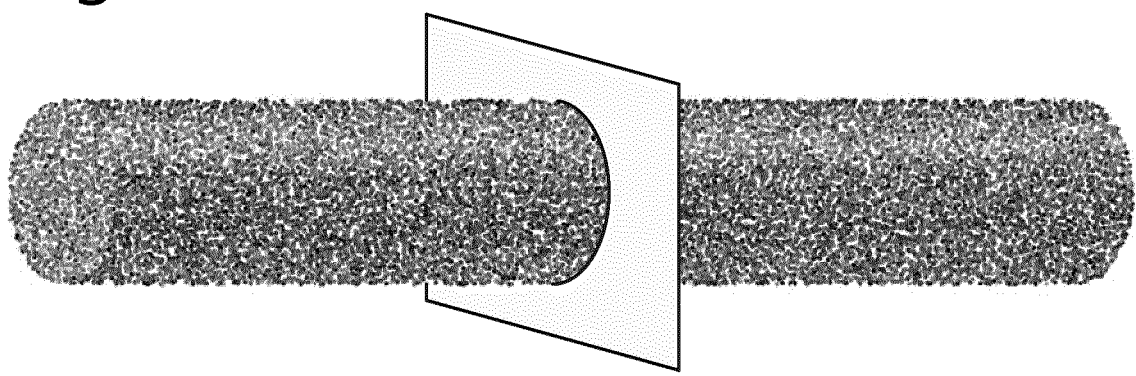
Figure 3C:
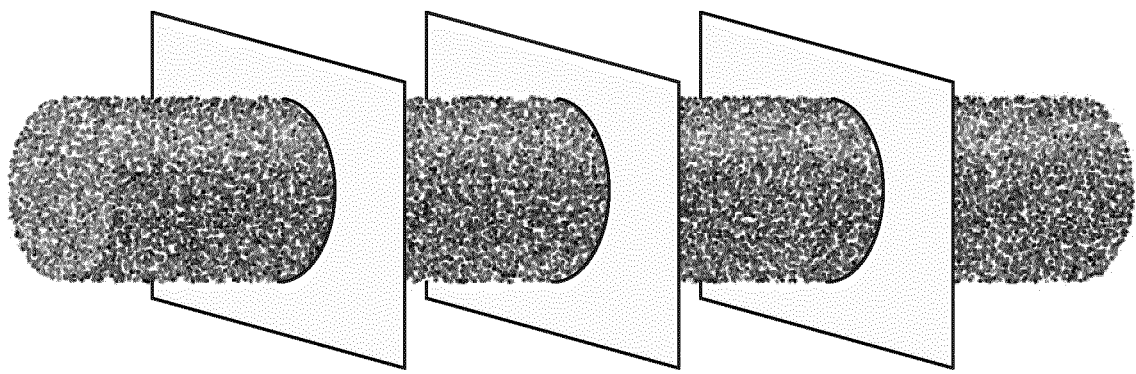
Figure 3D:
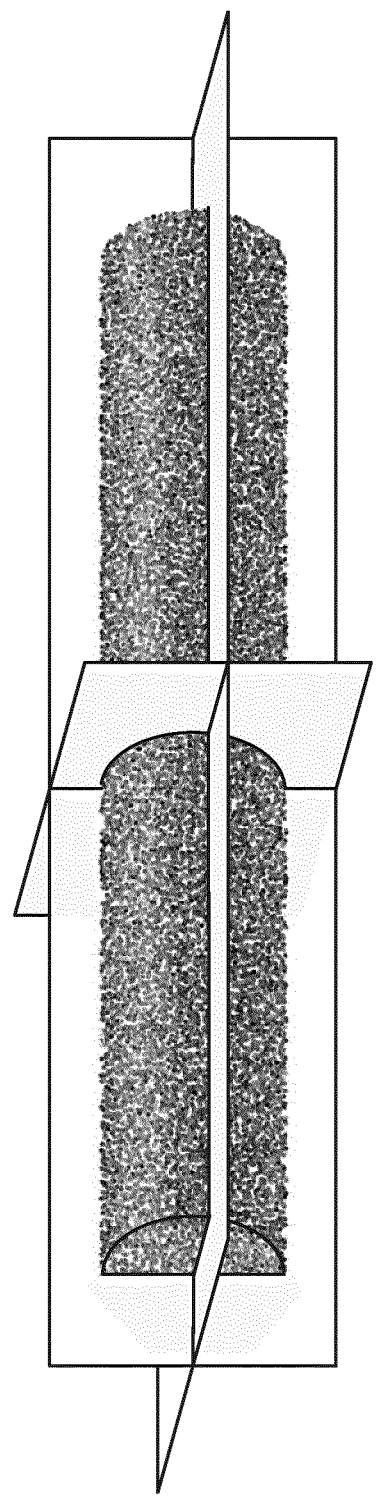

In the fourth example, slice plane subdivision methods for point clouds are compared and their impact on locality is assessed. Suppose a point cloud presents an elongated object such as a tube in FIG. 3A. With a first slice plane, the point cloud can be divided into two essentially mirroring parts (FIG. 3B). To preserve locality, it is most convenient to initially slice the tube further with slice planes parallel to the first slice plane. As the median cut algorithm determines the slice plane according to the longest dimension of the cell, the desired result is obtained (FIG. 3C). For this particular example, the octree subdivision method or the first three subdivision steps of the k-d tree subdivision method would result in the cell subdivision in FIG. 3D. Note that the geometrical extent, for example defined by the mean average radius of the points in a cell, decreases initially quicker with the median cut algorithm than with the octree or the k-d tree subdivision. It might therefore be advantageous to determine the slice plane subdivision method of a cell dynamically based on one or more parameters determined based at least in part on the distribution of points in the cell. For the considered subdivision methods for this highly symmetrical tube, the shown slice planes in FIGS. 3C and 3D also subdivide the point cloud in a cell in a symmetric way, i.e. the slice planes create two essentially mirroring point clouds in a cell by subdivision.

Example 5

Different Levels of Detail of a Single Cell

Figure 4A:
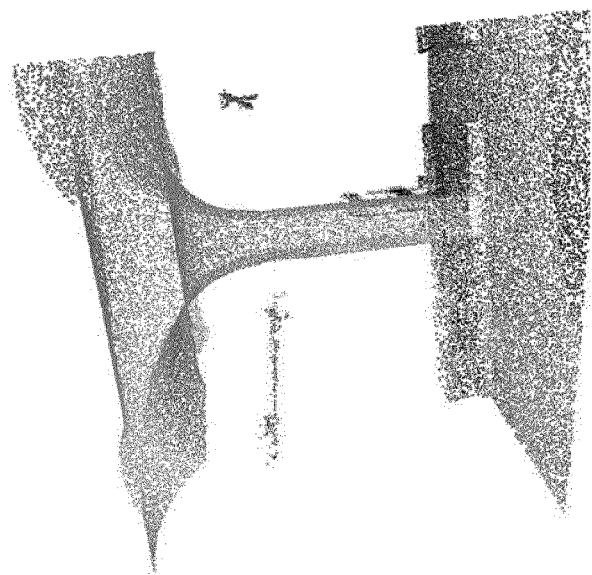
FIGS. 4A, 4B and 4C show different levels of detail of a cell of a preprocessed point cloud.
Figure 4B:
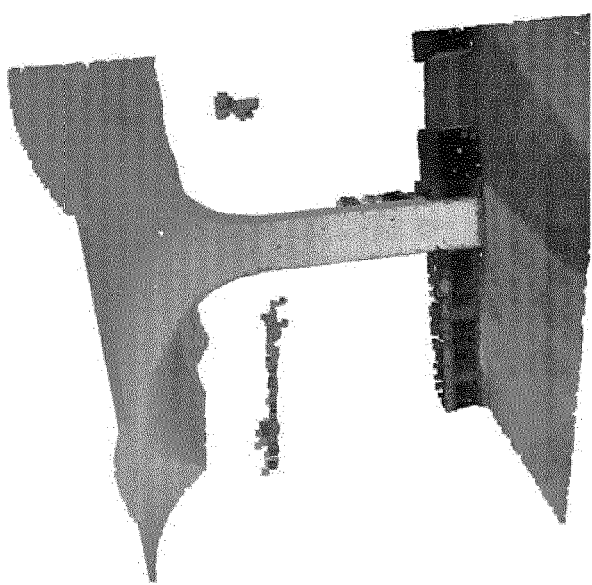
Figure 4C:
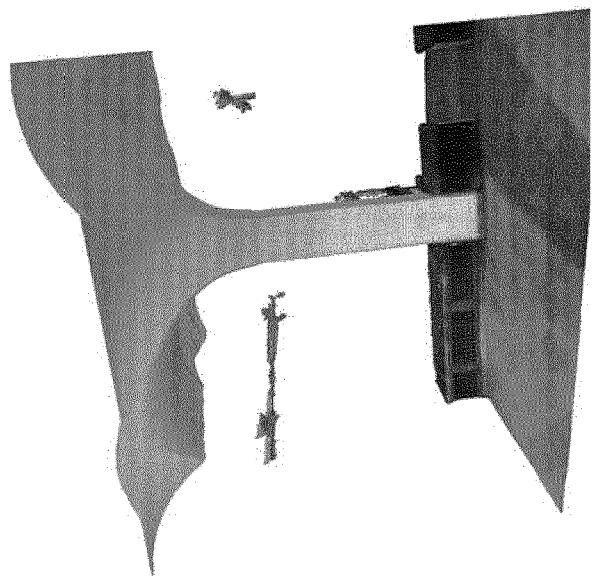

FIG. 4 shows pixelated images of different levels of detail of a single cell. The points in the cell comprise Cartesian coordinates as well as a grayscale. A pixelated image of the finest level of detail comprising about 2,000,000 points is shown in FIG. 4A. FIG. 4B and FIG. 4C show pixelated images of a coarser level of detail, comprising about 50,000 points. In FIG. 4B, the points are represented as squares instead of points, and the pixelated image therefore appears smoother in comparison to FIG. 4C.

Suppose a level of detail is suitable for rendering from a point of view with a certain distance to the cell (FIG. 4A). Upon finding closest point pairs and collapsing them into an equally weighted centroid, the coordinates of the two points of a pair are averaged as well as their grayscale. The thereby created level of detail comprises a number of points approximately equal to half the number of original points. The minimal distance between the points in the new level of detail is in addition increased compared to the minimal distance between the original points. It might therefore be required to distance the point of view further from the cell in order to obtain a smooth image in which individual points cannot be or cannot substantially be identified.

For rendering, the required distance of the point of view is of course an input parameter. Based on the projection of a cell bounding box on the image plane, and how the size of a pixel corresponds to an actual distance within the cell, a suitable minimal distance corresponding to a level of detail of the cell can be chosen in order to render the cell in the pixelated image.

In addition, in an embodiment one or more input parameters can be provided, based on which at least in part the size and shape of the points for the rendered image can be determined. The shape can be for example a circle, a square, a polygon, or any other two-dimensional shape. The size can be based on a radius, an edge size, a diameter, or any other length measure. These input parameters determine the appearance of the image. For example, in FIG. 4B and FIG. 4C the same points of the same level of detail are rendered, but in FIG. 4B the points are represented by squares with a certain spatial extent. The pixelated image in FIG. 4B therefore appears smoother compared to the one in FIG. 4C. This forms an additional possibility to obtain smooth images, in addition to the rendering of a finer level of detail.

Example 6

A First Method for Collapsing Points in a Cell

Figure 5:
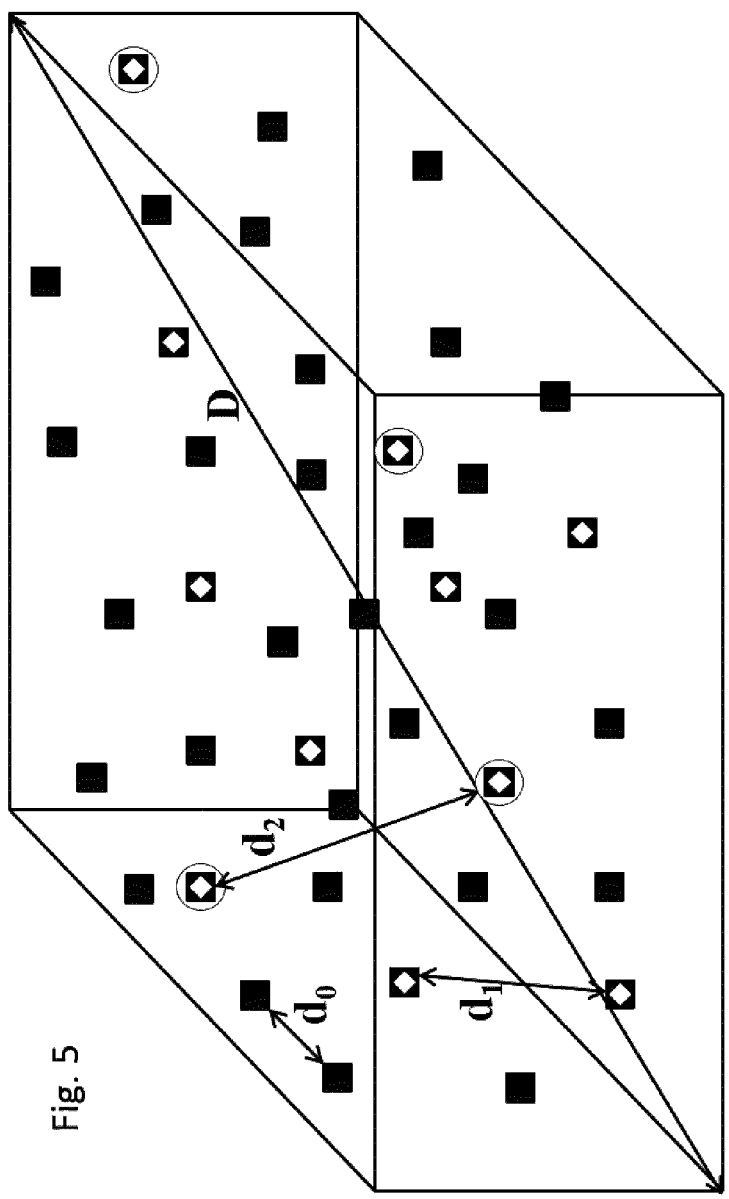
FIG. 5 serves to illustrate point collapse as well as level of detail selection for image rendering.

FIG. 5 shows a single cell comprising points. A first level of detail contains the points represented by squares. These points are divided over several groups. For each group, the evenly weighted geometrical center of the points in the group is determined and the point closest to this center is retained. These closest points are marked by diamonds and form the points of a second level of detail. The procedure is repeated to collapse the points from the second level of detail (diamonds) to a third level of detail (points represented by circles).

Example 7

A Second Method for Collapsing Points in a Cell

FIG. 5 shows a single cell comprising points. A first level of detail contains the points represented by squares. These points are divided over several groups. For each group, the point closest to the cell boundary is retained. These closest points are marked by diamonds and form the points of a second level of detail. The procedure is repeated to collapse the points from the second level of detail (diamonds) to a third level of detail (points represented by circles).

Example 8

Determining the Level of Detail for Rendering

FIG. 5 shows a single cuboid cell comprising points. A first level of detail contains the points represented by squares. A second level of detail contains the points represented by diamonds. A third level of detail contains the points represented by circles. The second level of detail is formed by grouping and collapsing points from the first level of detail according to the first aspect of the present invention, and the third level of detail is formed by grouping and collapsing points from the second level of detail. The minimal distance between the points of the first level of detail is denoted by $d_0$. The minimal distance between the points of the second level of detail is denoted by $d_1$. The minimal distance between the points of the third level of detail is denoted by $d_2$.

For rendering the point cloud of a three-dimensional cell, the following steps can be performed in the third aspect of the present invention:

Loading or determining the largest distance within the three-dimensional cell. For cuboid cells, this is the diameter D as denoted in FIG. 5. This distance D is expressed in world units. An example of a world unit is the meter (m), which can be used to denote positions and distances in a point cloud representing, for example, a building.

For the given view frustum, the bounding box of the three-dimensional cell is projected onto the two-dimensional image plane, i.e. the screen plane. For a cuboid cell, it is sufficient to project the eight corners of the cuboid onto the two-dimensional image plane. A two-dimensional rectangle is determined in the image plane, which encompasses all projected elements. This encompassing rectangle is preferentially the smallest encompassing rectangle. The encompassing two-dimensional rectangle has a diameter d. This diameter is expressed in number of pixels.

The ratio of the diameter D and the diameter d gives an indication of the local pixel size (LPS) and expresses the size of a screen pixel in world units:

$$LPS = \frac{D}{d}\left[\frac{\text{world unit}}{\text{pixel}}\right]$$

With the abovementioned example of the meter as world unit, the LPS gives an indication of the number of meters, typically a floating point number, corresponding to the size of a single pixel. The level of detail i of which the points are rendered in the pixelated image is determined based on the minimal distances $d_i$ of the levels of detail. The smallest value of $d_i$ (expressed in world units) which is larger or equal to the value of the LPS (expressed in world unit per pixel) determines the level of detail of which the points are rendered in the pixelated image.

The invention claimed is:

1. Computer-implemented preprocessing method to preprocess a point cloud, the preprocessing method comprising the steps of:

providing a point cloud, the point cloud comprising points, each of the points at least comprising coordinates which define a location in space;

recursively subdividing the point cloud in cells with slice planes, whereby subdivision of a given cell is stopped once the cell contains at most a predetermined amount of points;

for each cell containing at most the predetermined amount of points, creating a set of discrete levels of detail for the cell by recursively constructing a new coarser level of detail from a former finer level of detail, the construction of a new coarser level of detail comprising the steps of:

subdividing the points at the former finer level of detail of the cell into one or multiple groups;

collapsing the points within a group of points to a collapsed point, the collapsed point part of the points at the new coarser level of detail of the cell;

storing the preprocessed point cloud into one or multiple files on a non-transitory storage system, the preprocessed point cloud comprising:

geometrical information on the cell subdivision of the point cloud, the geometrical information sufficient to determine a bounding box for each cell;

for each cell, the number of levels of detail for the cell, and for each level of detail of the cell the points at that level of detail of the cell, and for each level of detail the minimal distance between the points at that level of detail of the cell.

2. Computer-implemented preprocessing method according to claim 1, whereby the recursive subdivision of the point cloud in cells is performed with an octree.

3. Computer-implemented preprocessing method according to claim 1, whereby the recursive subdivision of the point cloud in cells is performed with a k-d tree or by a median cut algorithm.

4. Computer-implemented preprocessing method according to claim 1, whereby the predetermined amount of points is at least 1000 and at most 64000.

5. Computer-implemented preprocessing method according to claim 1, whereby discrete levels of detail are created for a cell comprising at most the predetermined amount of points, simultaneously with the further subdivision of cells comprising more points than the predetermined amount.

6. Computer-implemented preprocessing method according to claim 1, whereby a group of points to be collapsed comprises a closest point pair.

7. Computer-implemented preprocessing method according to claim 6, whereby for the creation of discrete levels of detail in a cell a dynamic grid is imposed over the cell, the grid subdividing the cell in rectangular cuboids, a given cuboid comprising a given point, and whereby a closest point in the cell to the given point can be found by searching the given cuboid and the at most 26 cuboids adjacent to the given cuboid.

8. Computer-implemented preprocessing method according to claim 6, wherein each group of points to be collapsed consists either of a closest point pair or a single point.

9. Computer-implemented preprocessing method according to claim 1, whereby the collapsed point is an equally weighted centroid of the points in the group of points.

10. Computer-implemented preprocessing method according to claim 1, whereby the collapsed point is an unequally weighted centroid of the points in the group of points.

11. Computer-implemented preprocessing method according to claim 1, whereby the non-transitory storage system comprises two or more non-transitory storage mediums, and whereby the preprocessed point cloud is stored into two or more files, at least two of the non-transitory storage mediums each comprising at least one of the files.

12. Computer-implemented preprocessing method according to claim 1, wherein each slice plane splits the number of points in a cell approximately in half while preserving locality.

13. Viewing method for at least partially presenting a point cloud on a screen of a computing system, the computing system comprising the screen, a user interface, a processor, and a non-transitory storage system, the non-transitory storage system comprising the point cloud, the viewing method comprising the steps of:
    executing the preprocessing method according to claim 1 on the computing system;
    determining a screen resolution to create a pixelated image;
    providing a view frustum by means of the user interface;
    executing a computer-implemented rendering method on the computing system; and
    presenting the pixelated image on the screen.

14. Computer-implemented rendering method for rendering at least a part of a stored preprocessed point cloud in a pixelated image according to a view frustum, the pixelated image comprising an image plane and pixels, the preprocessed point cloud stored on a non-transitory storage system, the preprocessed point cloud comprising a cell subdivision of space to have a plurality of cells, geometrical information sufficient to determine the bounding box of each cell, more than one level of detail for each cell, each level of detail comprising a set of points, each level of detail further comprising the minimal distance between the points of the set of points, the rendering method comprising the steps of:
    loading the geometrical information sufficient to determine the bounding box of each cell from the non-transitory storage system;
    determining based at least in part on the view frustum the cells which contribute to the pixelated image;
    choosing for each contributing cell one of the minimal distances based at least in part on the bounding box, the view frustum, and the size of the pixels;
    loading for each contributing cell the set of points of the level of detail corresponding to the chosen minimal distance; and
    obtaining a pixelated image based at least in part on the loaded sets of points.

15. Computer-implemented rendering method according to claim 14, whereby the image plane is divided in regions, and whereby partial pixelated images are obtained per region, and whereby during the formation of a partial pixelated image only the sets of points corresponding to the determined minimal distances of the cells contributing to the partial pixelated image are loaded to a transitory storage medium.

16. Computer-implemented rendering method according to claim 15, wherein different regions treated at least partially in sequence.

* * * * *